US008290692B2

(12) United States Patent
Kitano et al.

(10) Patent No.: US 8,290,692 B2
(45) Date of Patent: Oct. 16, 2012

(54) ENGINE STARTING DEVICE FOR IDLING-STOP VEHICLE

(75) Inventors: Hiroaki Kitano, Tokyo (JP); Masahiko Kurishige, Tokyo (JP); Akihiko Imagi, Tokyo (JP); Daisuke Mizuno, Tokyo (JP); Koichiro Kamei, Tokyo (JP); Kazuhiro Odahara, Tokyo (JP); Naohito Kaneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 623 days.

(21) Appl. No.: 12/558,994

(22) Filed: Sep. 14, 2009

(65) Prior Publication Data

US 2010/0256896 A1 Oct. 7, 2010

(30) Foreign Application Priority Data

Apr. 3, 2009 (JP) ................................ 2009-091466

(51) Int. Cl.
*G06F 19/00* (2011.01)
*F02N 11/08* (2006.01)
*F02N 15/02* (2006.01)

(52) U.S. Cl. ..................... 701/113; 701/112; 123/179.4; 123/179.25; 290/38 C

(58) Field of Classification Search ............... 123/179.3, 123/179.4, 179.25; 701/54, 101, 102, 112, 701/113; 74/6, 7 R; 903/905; 290/38 R, 290/38 C
See application file for complete search history.

(56) References Cited

U.S. PATENT DOCUMENTS

| | | | | |
|---|---|---|---|---|
| 7,218,010 | B2 * | 5/2007 | Albertson et al. | 290/38 R |
| 7,996,135 | B2 * | 8/2011 | Ishii et al. | 701/113 |
| 2004/0221828 | A1 | 11/2004 | Ries-Mueller et al. | |
| 2011/0213525 | A1 * | 9/2011 | Kanemoto et al. | 74/7 R |
| 2012/0103294 | A1 * | 5/2012 | Kitano et al. | 123/179.25 |

FOREIGN PATENT DOCUMENTS

| | | | | |
|---|---|---|---|---|
| DE | 10 2006 011 644 | A1 | 9/2007 | |
| DE | 10 2006 039 112 | A1 | 2/2008 | |
| EP | 2 233 731 | A2 | 9/2010 | |
| JP | 2001173546 | A * | 6/2001 | 123/170.25 |
| JP | 2002-70699 | | 3/2002 | |
| JP | 2005-330813 | | 12/2005 | |
| WO | WO 2010/012530 | A1 | 2/2010 | |
| WO | WO 2010/046164 | A1 | 4/2010 | |

OTHER PUBLICATIONS

Extended Search Report issued Nov. 4, 2010 in EP Application No. 09171405.5.
U.S. Appl. No. 13/380,525, filed Dec. 23. 2011, Kitano, et al.

* cited by examiner

*Primary Examiner* — Willis R Wolfe, Jr.
(74) *Attorney, Agent, or Firm* — Oblon, Spivak, McClelland, Maier & Neustadt, L.L.P.

(57) ABSTRACT

An engine-starting device for stopping the engine after satisfaction of an idling-stop condition during idling of a vehicle, starting rotation of a starter-motor upon satisfaction of a starter-motor rotation start condition, and causing a pinion gear to mesh with a ring gear upon satisfaction of a pinion gear meshing condition, includes the ring gear to be connected to a crank shaft, the pinion gear for transmitting the starter-motor rotation, a plunger for causing the pinion gear to mesh with the ring gear, and a starter control section for instructing energization of the starter-motor, in which the starter-motor is energized to be rotated upon the satisfaction of the starter-motor rotation start condition prior to clearing of the idling-stop condition in response to a restart request, and the pinion gear is caused to mesh with the ring gear by the plunger upon the satisfaction of the pinion gear meshing condition.

19 Claims, 7 Drawing Sheets

ENGINE STARTING DEVICE FOR IDLING-STOP VEHICLE

BACKGROUND OF THE INVENTION

1. Field of the Invention

The present invention relates to an engine starting device for an idling-stop vehicle.

2. Description of the Related Art

For conventional engine start in an idling-stop vehicle, a starter motor is energized to control its speed in synchronization with a rotation speed of the engine to cause a gear on the starter motor side to mesh with a gear on the engine side. In this manner, the engine is restarted (for example, see JP 2002-70699 A; hereinafter, referred to as Patent Document 1).

In another conventional device, upon generation of an engine restart request, the energization of the starter motor is started. At the time when a difference between the rotation speed of the engine and that of the starter motor falls within a predetermined range, a pinion gear directly connected to a rotating shaft of the starter motor is moved forward and backward to mesh with a ring gear, thereby restarting the engine (for example, see JP 2005-330813 A; hereinafter, referred to as Patent Document 2).

In the device of Patent Document 1 described above, however, a system for energizing the starter motor to control its speed is required. In the speed control/energization system as described above, for example, for changing a voltage by duty control or the like, an electronic circuit such as a relay or a transistor must be provided.

Moreover, in the device of Patent Document 2 described above, after the generation of the engine restart request, the starter motor is energized to synchronize the engine and the starter motor with each other to cause the gears to mesh with each other. Therefore, a long period of time is required to increase the rotation speed of the starter motor. In particular, when the restart request is generated immediately after the occurrence of an idling-stop state or the like, there is a problem that a delay in engine restart is noticeable.

SUMMARY OF THE INVENTION

The present invention has been made for solving the problems described above, and therefore has an object to provide an engine starting device for an idling-stop vehicle, which does not require energization for speed control of a starter motor to thereby eliminate the need of a relay or a transistor for the energization for speed control to reduce cost and starts energizing the starter motor prior to a restart request after satisfaction of an idling-stop condition to reduce a period of time for allowing a ring gear and a pinion gear to mesh with each other.

According to the present invention, there is provided an engine starting device for an idling-stop vehicle, for stopping an engine upon satisfaction of a predetermined idling-stop condition during idling of the vehicle, including: a ring gear to be connected to a crank shaft of the engine; a starter motor unit including a starter motor, a pinion gear for transmitting rotation of the starter motor, and a pinion gear connection means for causing the pinion gear to mesh with the ring gear; and a starter control section for controlling the starter motor unit. In the engine starting device, the starter control section energizes the starter motor to cause the starter motor to rotate upon satisfaction of a predetermined starter motor rotation start condition prior to clearing of the idling-stop condition in response to a restart request after the satisfaction of the idling-stop condition, and causes the pinion gear to mesh with the ring gear to be connected thereto by the pinion gear connection means upon satisfaction of a predetermined pinion gear meshing condition.

According to the present invention, the starter motor is energized according to the starter motor rotation start condition judged by the starter control section. Therefore, an electronic circuit for the energization for speed control such as a relay or a transistor is no longer required to thereby enable a reduction in cost for starting the engine. Moreover, because the starter motor is energized without waiting for the engine restart request to allow the rpm of the starter motor to be increased more quickly, a period of time required to start the engine can be reduced.

DETAILED DESCRIPTION OF THE PREFERRED EMBODIMENTS

Figure 1:
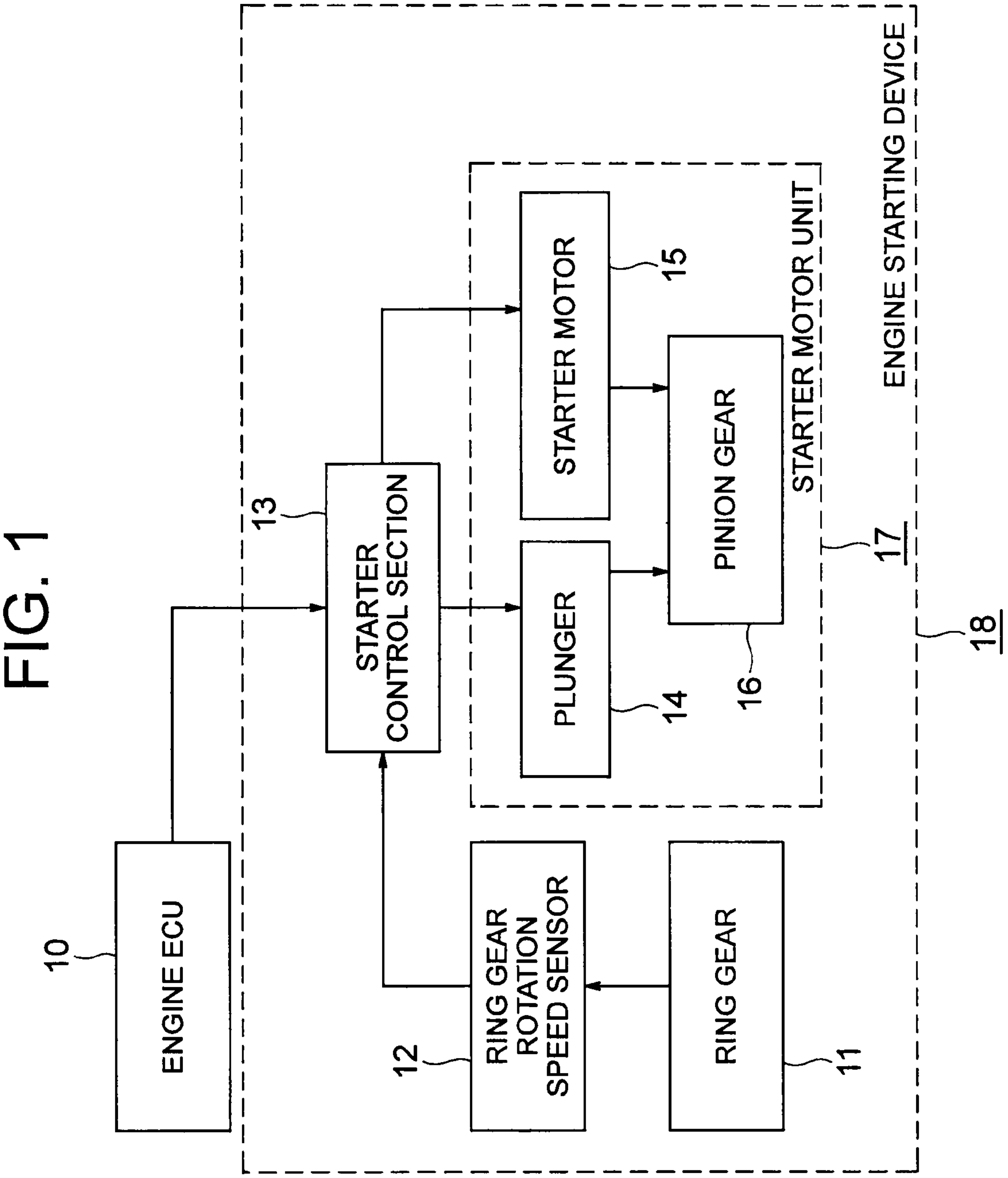
FIG. 1 is a schematic configuration diagram of an engine starting device for an idling-stop vehicle according to a first embodiment of the present invention.

Hereinafter, an engine staring device for an idling-stop vehicle according to the present invention is described according to each of embodiments referring to the drawings.

First Embodiment

FIG. 1 is a schematic configuration diagram of an engine starting device for an idling-stop vehicle according to a first embodiment of the present invention. In FIG. 1, an engine electric control unit (ECU) 10 judges satisfaction of an idling-stop condition and generation of a restart request as a result of clearing of the idling-stop condition based on a status of each section of an engine, signals from various detectors for engine control, and the like to input an idling-stop condition satisfaction signal, a restart request signal (for example, clearing of idling-stop condition satisfaction signal) and the like to an engine starting device 18.

In the engine starting device 18, a ring gear 11 transmits the rotation of the engine. A ring gear rotation speed sensor (ring gear rotation speed detecting means) 12 detects a rotation speed of the ring gear 11. A starter motor unit 17 includes a plunger 14, a starter motor 15, and a pinion gear 16. A starter control section 13 controls the energization of the starter motor 15 of the starter motor unit 17 or the like according to a signal from the engine ECU 10 or the ring gear rotation speed sensor 12.

In the starter motor unit 17, the starter motor 15 is energized by a battery (denoted by the reference symbol 21 in FIG. 7) according to the control of the starter control section 13, thereby rotating the pinion gear 16 connected to the starter motor 15. Moreover, the pinion gear 16 is moved by the plunger 14 according to the control of the starter control section 13 to be connected to the ring gear 11.

Figure 2:
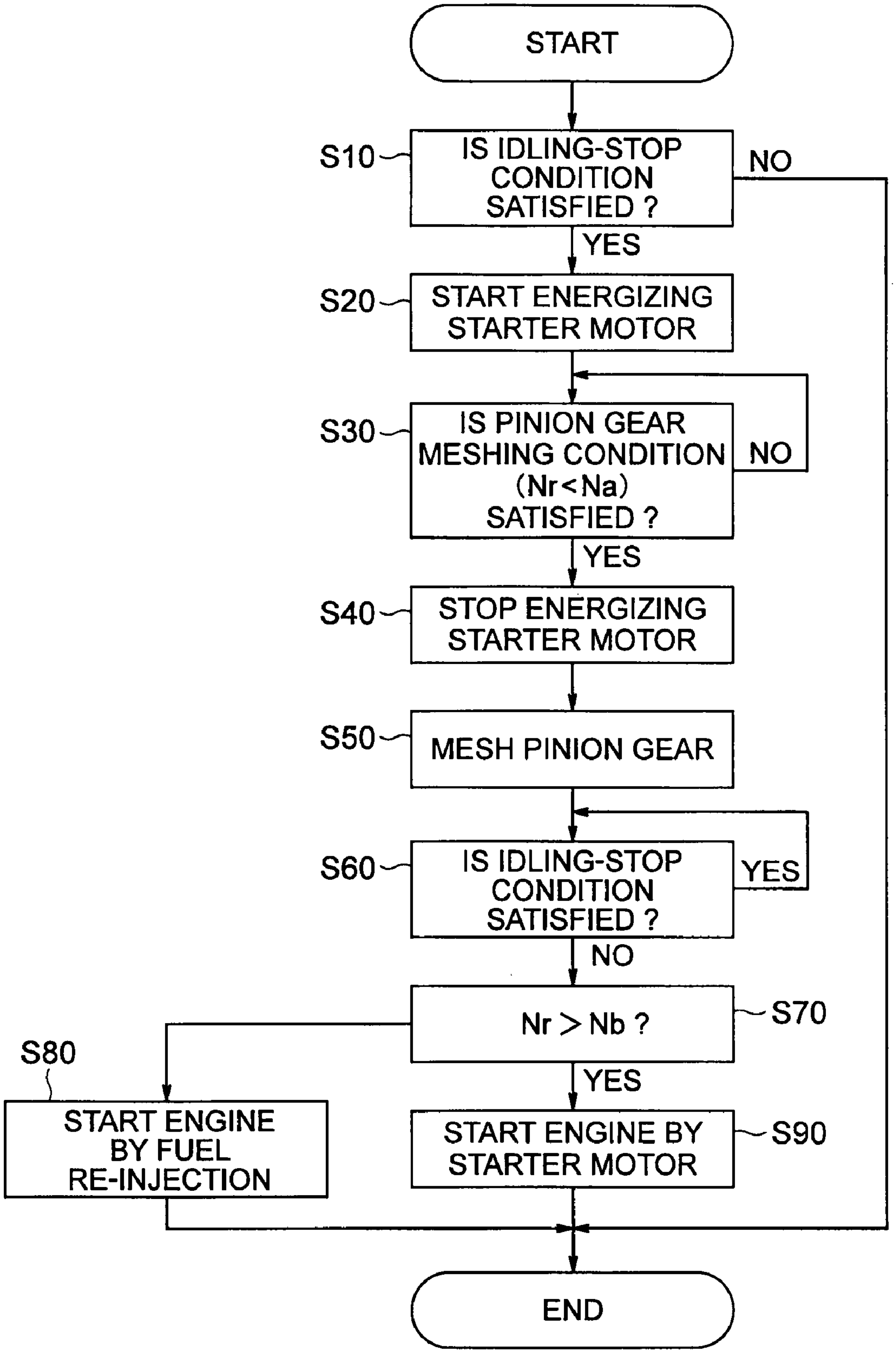
FIG. 2 is a flowchart of an operation by control of a starter control section of the engine starting device illustrated in FIG. 1.

FIG. 2 is a flowchart of an operation by the control of the starter control section of the engine starting device illustrated in FIG. 1. Hereinafter, processing performed in the starter control section 13 in the present invention is described referring to FIG. 2. First, it is judged based on the idling-stop condition satisfaction signal from the engine ECU 10 whether or not the idling-stop condition is satisfied (Step S10: idling-stop condition=starter motor rotation start condition). If it is judged that the idling-stop condition is satisfied, the processing proceeds to Step S20 where the energization of the starter motor 15 is started with a battery voltage from the battery (denoted by the reference symbol 21 in FIG. 7).

Next, it is judged whether or not a condition for meshing the pinion gear is satisfied (Step S30: pinion gear meshing condition). If the pinion gear meshing condition is satisfied, the processing proceeds to Step S40. Here, the pinion gear meshing condition is that a ring gear rotation speed Nr, which is detected by the ring gear rotation speed sensor 12, is less than a sum Na of a steady-state value of the rotation speed of the starter motor with an input voltage and a difference (Ne) in rotation speed between the ring gear and the pinion gear at which the ring gear 11 and the pinion gear 16 can mesh with each other (for example, 300 rpm; in the present invention, the rotation speed is hereinafter described in terms of rotation speed at the ring gear for simplicity). If Nr<Na is satisfied, the processing proceeds to Step S40.

Then, the energization of the starter motor 15 is stopped (Step S40). The pinion gear 16 is pushed out by the plunger 14 to mesh with the ring gear 11 (Step S50). Then, in Step S60 (restart request condition), it is judged whether or not the idling-stop condition is satisfied. If the idling-stop condition is no longer satisfied due to, for example, an action of a driver such as releasing a foot from a brake pedal or pressing an accelerator to clear the idling-stop condition satisfaction signal from the engine ECU 10 and the restart request signal is then input, the processing proceeds to Step S70.

In Step S70, it is judged whether or not the ring gear rotation speed Nr is larger than a rotation speed Nb (for example, 500 rpm) at which the engine can be started by fuel re-injection. If the ring gear rotation speed Nr is larger than the rotation speed Nb, the processing proceeds to Step S80 where the engine is started by the fuel re-injection. The starter control section of the present invention is not particularly directly concerned with the engine start by the fuel re-injection (hereinafter, the same shall apply). If the ring gear rotation speed Nr is equal to or less than Nb in Step S70, the starter motor unit 17 is re-energized to transmit the rotation to the engine to thereby start the engine (Step S90). In this manner, the energization of the starter motor 15 and the operation of the plunger 14 are instructed in the starter control section 13 to connect the ring gear 11 and the pinion gear 16 to each other, thereby enabling the restart of the engine.

As described above, in this first embodiment, the engine ECU 10 for instructing the satisfaction of the idling-stop condition (Step S10), the ring gear 11 for transmitting the rotation of the engine, the ring gear rotation speed sensor 12 for detecting the rotation speed of the ring gear, the starter motor unit 17, and the starter control section 13 for instructing the energization of the starter motor 15 and the operation of the plunger 14 and for judging the pinion gear meshing condition (Step S30) are provided.

The starter motor unit 17 includes the starter motor 15 which is rotated by the energization from the starter control section 13, the pinion gear 16 for transmitting the rotation of the starter motor 15, and the plunger 14 for connecting the ring gear 11 and the pinion gear 16 to each other. The starter control section 13 receives the signal from the engine ECU 10 to cause the starter motor unit 17 including the plunger 14, the starter motor 15, and the pinion gear 16 to operate according to the flowchart of FIG. 2.

According to this first embodiment, the satisfaction of the idling-stop condition is input by the engine ECU 10 to the starter control section 13 to start energizing the starter motor unit 17 simultaneously with the satisfaction of the idling-stop condition (idling-stop condition=starter motor rotation start condition). As a result, a period of time required to allow the pinion gear 16 and the ring gear 11 to mesh with each other is reduced. Once the pinion gear and the ring gear are caused to mesh with each other, the engine can be started at the time when the idling-stop condition becomes no longer satisfied (the restart request is generated). Moreover, a mechanism for regulating the voltage is not required.

Second Embodiment

Figure 3:
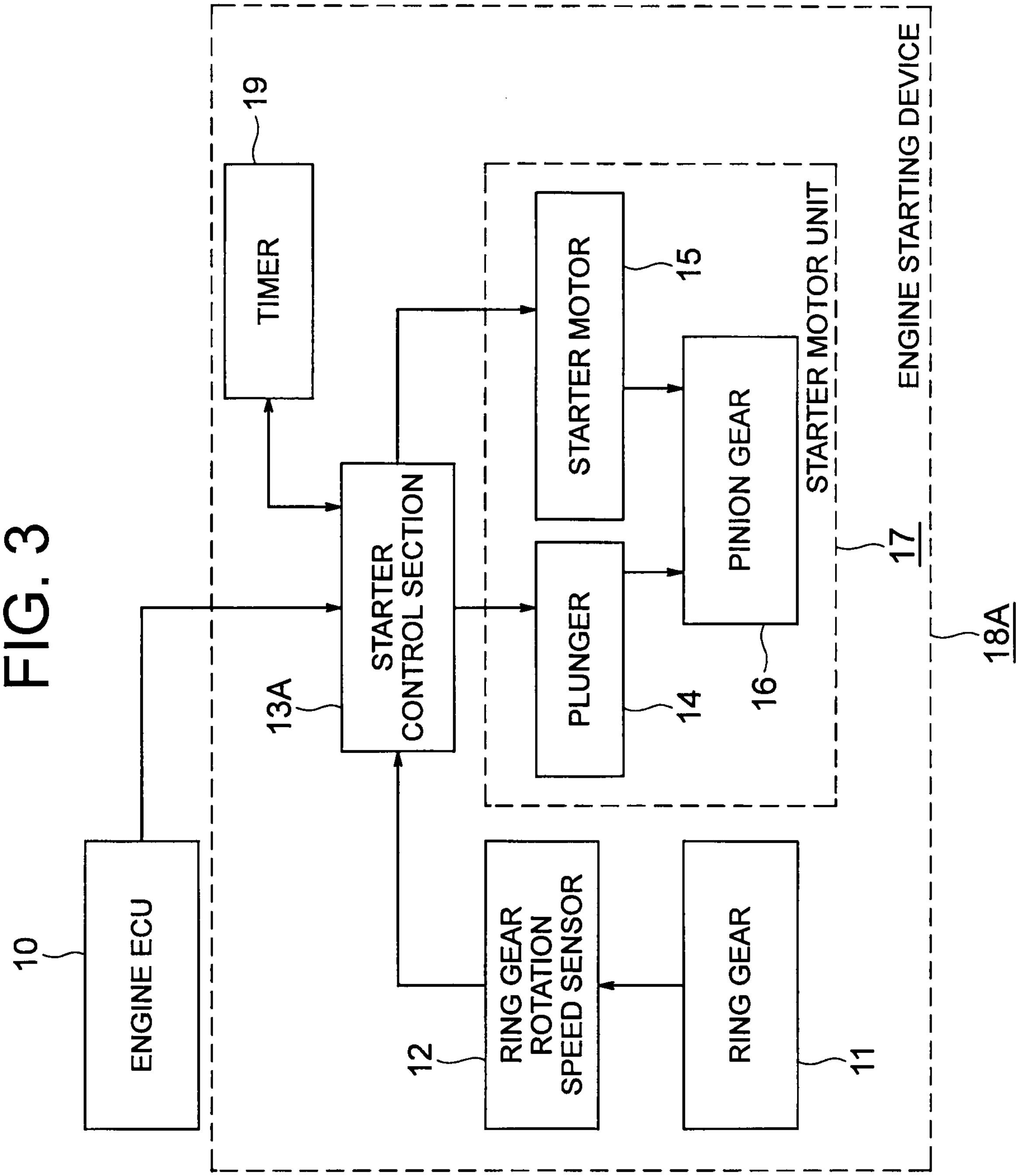
FIG. 3 is a schematic configuration diagram of an engine starting device for an idling-stop vehicle according to a second embodiment of the present invention.
Figure 4:
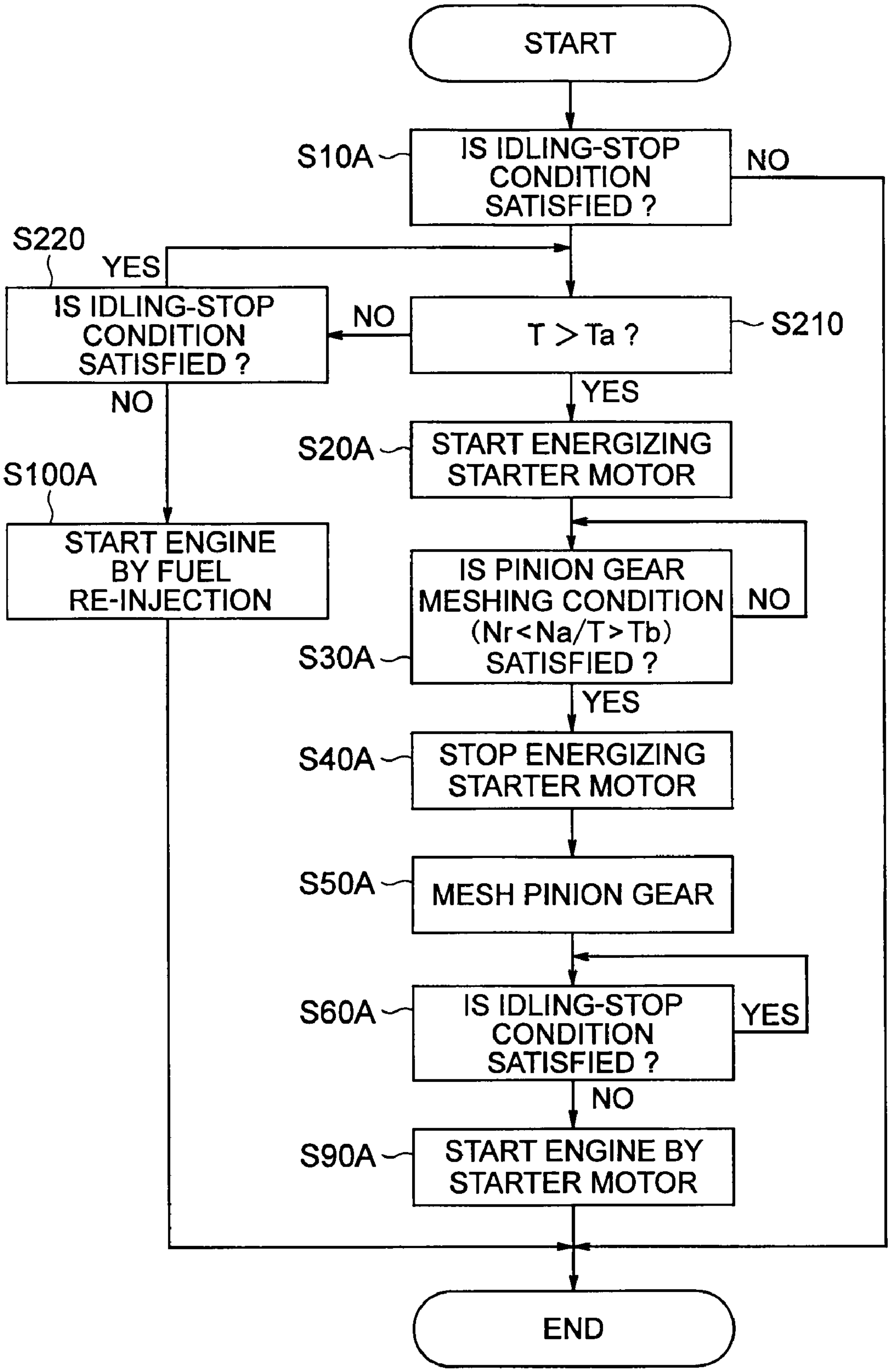
FIG. 4 is a flowchart of an operation by control of a starter control section of the engine starting device illustrated in FIG. 3.

FIG. 3 is a schematic configuration diagram of an engine starting device for an idling-stop vehicle according to a second embodiment of the present invention. FIG. 4 is a flowchart of an operation by the control of the starter control section of the engine starting device illustrated in FIG. 3. The same or equivalent parts to those of the embodiment described above are denoted by the same reference symbols or the same reference symbols followed by "A", and the detailed description thereof is herein omitted. In this second embodiment, a timer 19 is added to the first embodiment described above, as illustrated in FIG. 3. Based on a signal from the timer 19, processing is performed in a starter control section 13A.

In FIG. 3, an engine starting device 18A includes the starter control section 13A for performing the control by additionally using the timer 19. Upon satisfaction of the idling-stop condition, the starter control section 13A measures an elapsed period of time T from the satisfaction of the idling-stop condition with the timer 19. Next, referring to FIG. 4, the processing performed in the starter control section 13A in the second embodiment of the present invention is described.

In Step S10A (idling-stop condition), if it is judged based on the input of the idling-stop condition satisfaction signal from the engine ECU 10 that the idling-stop condition is satisfied, the processing proceeds to Step S210. If not, the processing is terminated. In Step S210 (starter motor rotation start condition), if the period of time T elapsing from the satisfaction of the idling-stop condition, which is measured by the timer 19, exceeds a period of time Ta (for example, 0.2 seconds) required for the ring gear rotation speed to be equal to or lower than a rotation speed at which the restart is impossible by fuel injection due to inertial rotation, the processing proceeds to Step S20A. If the period of time T does not exceed the Ta second(s), specifically, the period of time T is equal to or less than the Ta second(s), the processing proceeds to Step S220.

In Step S220 (restart request condition), it is judged based on the signal from the engine ECU 10 whether or not the idling-stop condition is satisfied. If the idling-stop condition is satisfied, the processing returns to Step S210. If not, the processing proceeds to Step S100A to start the engine by the fuel re-injection. In Step S20A, the energization of the starter motor 15 is started with the battery voltage from the battery to rotate the pinion gear 16. Then, the processing proceeds to Step S30A.

In Step S30A (pinion gear meshing condition), it is judged whether or not the period of time T from the satisfaction of the idling-stop condition exceeds a sum Tb (for example, 0.3 seconds) of a period of time required for the rotation speed of the starter motor to be a steady-state value and the period of time Ta and whether or not the ring gear rotation speed Nr detected by the ring gear rotation speed sensor 12 is less than the sum Na (for example, 300 rpm) of the steady-state value of the rotation speed of the starter with the input voltage and the difference in rotation speed between the ring gear and the pinion gear at which the ring gear and the pinion gear can mesh with each other. If at least one of Nr<Na and T>Tb is satisfied, the energization of the starter motor 15 is stopped (Step S40A) and the processing proceeds to Step S50A. Then, in Step S50A, the pinion gear 16 is pushed out by the plunger 14 to mesh with the ring gear 11. In Step S30A, the energization may be stopped to mesh the ring gear and the pinion gear with each other when Nr<Na and T>Tb are both satisfied. Further, only any one of Nr and T may be a target of judgment.

Then, it is judged whether or not the idling-stop condition is satisfied (Step S60A: restart request condition). If the idling-stop condition is not satisfied, the starter motor is energized to start the engine (Step S90A).

As described above, for example, in the case of the engine with a slow reduction in rotation speed of the engine after the idling stop, the start of the energization of the starter motor 15 is delayed until the rotation speed of the ring gear is lowered in the starter control section 13A based on the time input from the timer 19. As a result, a needless energization time can be reduced to increase a lifetime of the starter motor (to reduce the wear of a brush or the like).

Moreover, the energization is stopped after the period of time for making the rotation speed of the starter to be the steady-state value elapses and the ring gear rotation speed is lowered to the sum of the steady-state value of the rotation speed of the starter motor and the rotation speed at which the ring gear and the pinion gear can mesh with each other. As a result, the rotation speed of the starter motor becomes the steady-state value and the meshing of the gears is further facilitated.

As described above, according to the second embodiment of the present invention, the timer 19 is further provided. The starter control section 13A further uses the period of time T from the satisfaction of the idling-stop condition, which is input from the timer 19, to energize the starter motor. Therefore, the unnecessary energization can be eliminated.

Third Embodiment

Figure 5:
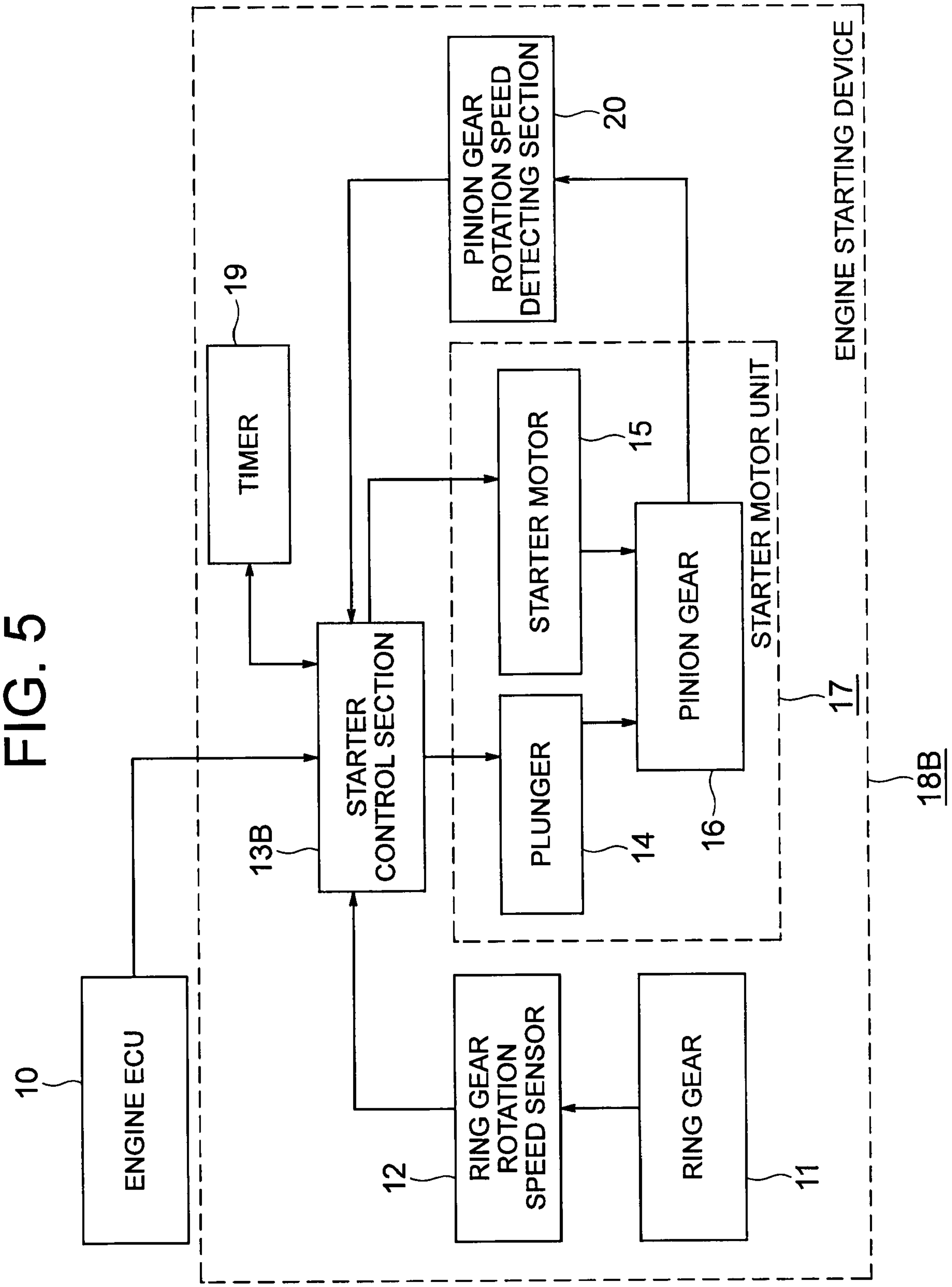
FIG. 5 is a schematic configuration diagram of an engine starting device for an idling-stop vehicle according to a third embodiment of the present invention.
Figure 6:
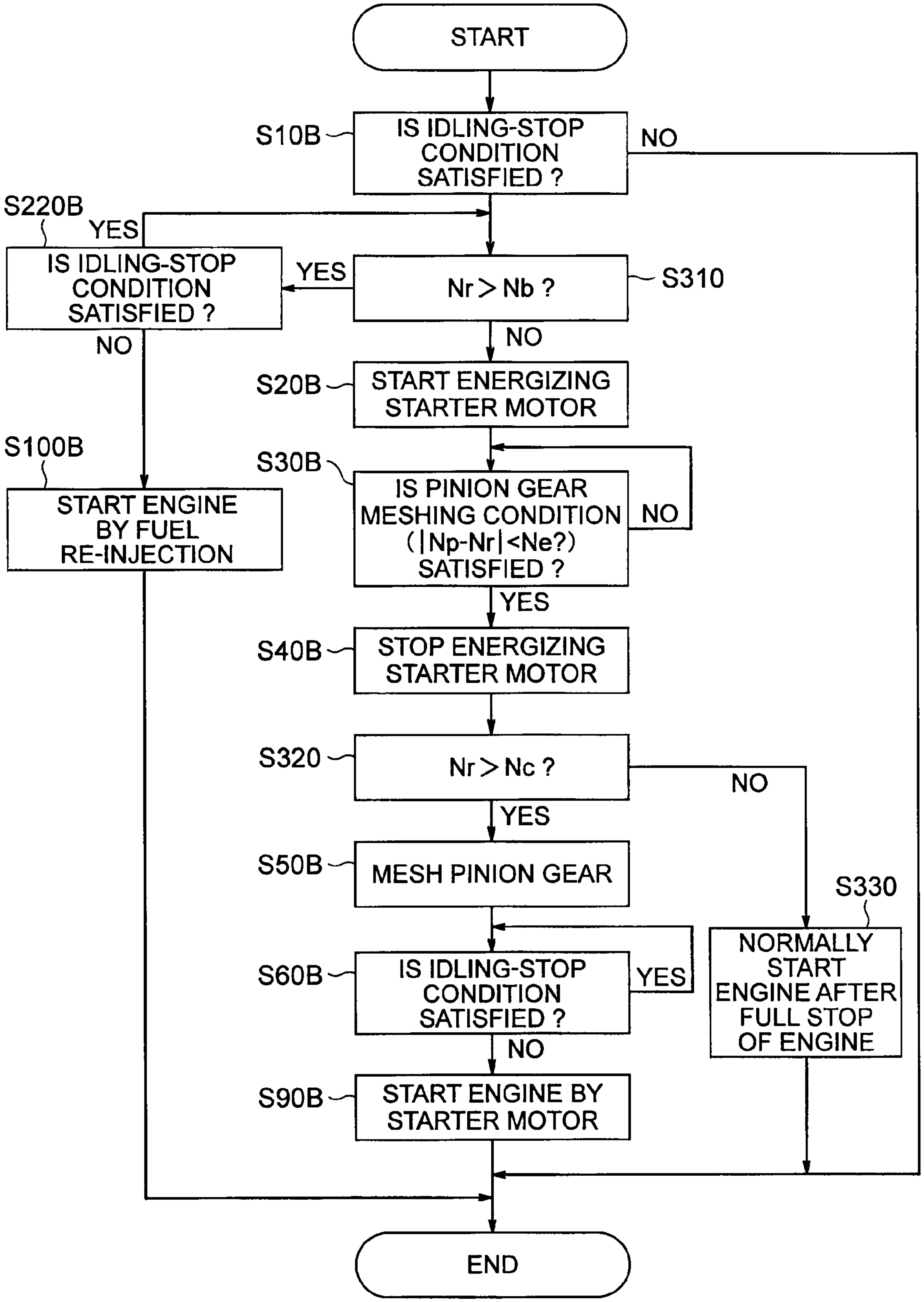
FIG. 6 is a flowchart of an operation by control of a starter control section of the engine starting device illustrated in FIG. 5.

FIG. 5 is a schematic configuration diagram of an engine starting device for an idling-stop vehicle according to a third embodiment of the present invention. FIG. 6 is a flowchart of an operation by the control of the starter control section of the engine starting device illustrated in FIG. 5. The same or equivalent parts to those of the embodiments described above are denoted by the same reference symbols or the same reference symbols followed by "B", and the detailed description thereof is herein omitted. The timer 19 is provided in the second embodiment described above. In this third embodiment, as illustrated in FIG. 5, a pinion gear rotation speed detecting section (pinion gear rotation speed detecting means) 20 for detecting a rotation speed Np of the pinion gear 16 is further provided. Based on a signal from the pinion gear rotation speed detecting section 20, the processing is performed in a starter control section 13B.

In FIG. 5, an engine starting device 18B includes the starter control section 13B which additionally uses the pinion gear rotation speed detecting section 20 to perform the control. In the pinion gear rotation speed detecting section 20, for example, the pinion gear rotation speed Np may be detected by a hall device or the like or by using a known estimation technology or the like. Then, the obtained pinion gear rotation speed Np is input to the starter control section 13B. Next, referring to FIG. 6, the processing performed in the starter control section 13B in the third embodiment of the present invention is described.

In Step S10B (idling-stop condition), if it is judged based on the input of the idling-stop condition satisfaction signal from the engine ECU 10 that the idling-stop condition is satisfied, the processing proceeds to Step S310. If not, the processing is terminated. In Step S310 (starter motor rotation start condition), it is judged whether or not the ring gear rotation speed Nr measured by the ring gear rotation speed sensor 12 is larger than the rotation speed Nb (for example, 500 rpm) at which the engine can be restarted by the fuel injection. If it is judged that the ring gear rotation speed Nr is equal to or smaller than Nb, the processing proceeds to Step S20B. If the ring gear rotation speed Nr is larger than Nb, the processing proceeds to Step S220A.

In Step S220B (restart request condition), it is judged based on the signal from the engine ECU 10 whether or not the idling-stop condition is satisfied. If the idling-stop condition is satisfied, the processing returns to Step S310. If not, the processing proceeds to Step S100B to start the engine by the fuel re-injection. In Step S20B, the energization of the starter motor 15 is started with the battery voltage from the battery to rotate the pinion gear 16. Then, the processing proceeds to Step S30B.

In Step S30B (pinion gear meshing condition), it is judged whether or not an absolute value $|Np-Nr|$ of a difference between the pinion gear rotation speed Np detected by the pinion gear rotation speed detecting section 20 and the ring gear rotation speed Nr measured by the ring gear rotation speed sensor 12 is less than the difference Ne in rotation speed (for example, 100 rpm) at which the ring gear and the pinion gear can mesh with each other. If the absolute value is less than Ne, the energization of the starter motor 15 is stopped (Step S40B) and the processing proceeds to Step S320.

In Step S320B (meshing inhibiting means), it is judged whether or not the rotation speed of the engine is lowered due to the inertial rotation and the engine is rotating in a reverse direction. Specifically, it is judged whether or not the ring gear rotation speed Nr is larger than Nc (for example, 0 rpm). If the ring gear rotation speed Nr is larger than Nc, the processing proceeds to Step S50B. If the ring gear rotation speed Nr is equal to or less than Nc, it is judged that there is a possibility of the reverse rotation of the ring gear 11 and the processing proceeds Step S330 where the engine is normally started after the full stop of the engine. After Step S50B, the same processing as that of the second embodiment after Step S50A is performed and the engine is started by the starter motor (FIG. 4).

The meshing inhibiting means corresponding to Steps S320 and S330 for judging that there is a possibility that the rotation speed of the engine is lowered due to the inertial rotation to cause the ring gear 11 to rotate in the reverse direction may be implemented not only at the timing illustrated in the flowchart of FIG. 6 but also at other timing, or may also be implemented at the desired multiple number of timings. Further, the possibility of the reverse rotation of the ring gear may be constantly detected during the operation illustrated in FIG. 6 in parallel thereto to inhibit the ring gear and the pinion gear from meshing with each other when there is a possibility of the reverse rotation of the ring gear.

As described above, by the input from the ring gear rotation speed sensor 12, the start of the energization of the starter motor 15 is delayed until the ring gear rotation speed is lowered in the starter control section 13B. As a result, an excessive energization time can be further reduced to increase the lifetime of the starter motor 15 (to reduce the wear of the brush or the like).

Further, the energization is stopped after the difference in rotation speed between the pinion gear rotation speed detected by the pinion gear rotation speed detecting section 20 and the ring gear rotation speed detected by the ring gear rotation speed sensor 12 is lowered to be less than the rotation speed at which the ring gear and the pinion gear can mesh with each other. Therefore, the ring gear and the pinion gear can mesh with each other more smoothly.

As described above, according to this third embodiment, the pinion gear rotation speed detecting section 20 is further provided. The starter control unit 13B additionally uses the pinion gear rotation speed Np input from the pinion gear rotation speed detecting section 20 to energize the starter motor. Therefore, for example, when an idling rotation speed is high, unnecessary energization can be eliminated. Moreover, when the difference between the rotation speed of the ring gear and the rotation speed of the pinion gear becomes small, the energization is stopped to cause the ring gear and the pinion gear to mesh with each other. As a result, the ring gear and the pinion gear can smoothly mesh with each other. Further, the meshing of the ring gear and the pinion gear is inhibited during the reverse rotation of the ring gear. As a result, damage to the pinion gear and the ring gear can be avoided.

Fourth Embodiment

Figure 7:
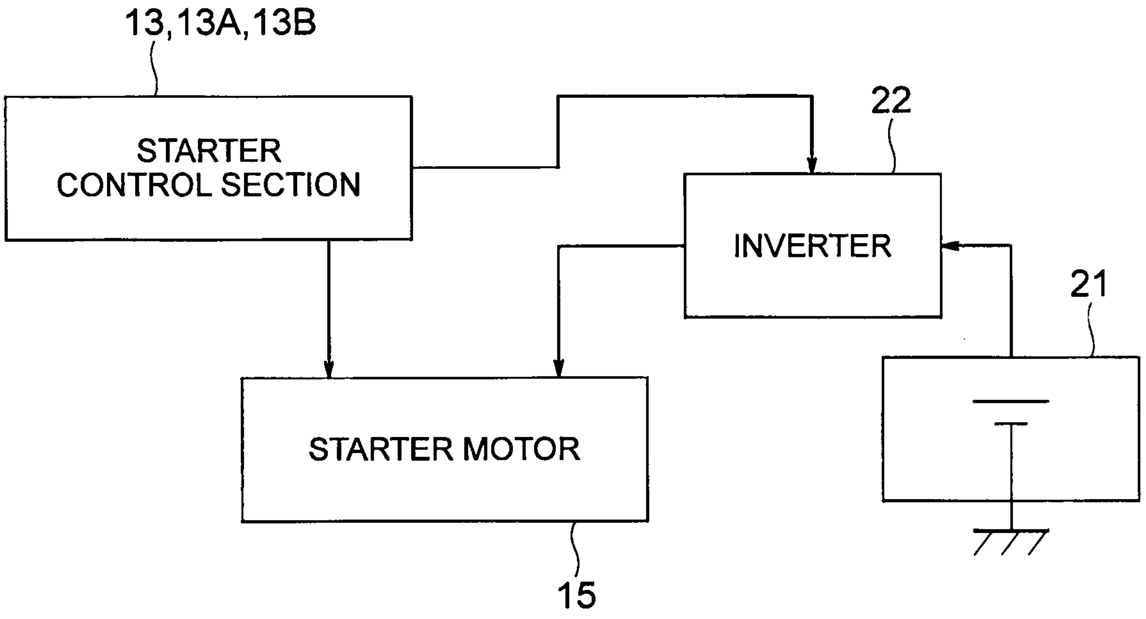
FIG. 7 is a partial schematic configuration diagram of an engine starting device for an idling-stop vehicle according to a fourth embodiment of the present invention.

FIG. 7 is a partial schematic configuration diagram of an engine starting device for an idling-stop vehicle according to a fourth embodiment of the present invention. In the first to third embodiments described above, the starter motor 15 is energized directly with the battery voltage from the battery 21. As illustrated in FIG. 7, however, an inverter 22 corresponding to a transformer capable of controlling a transformation ratio by the starter control section 13, 13A, or 13B is provided to a power supply line from the battery 21 to the starter motor 15. In this manner, electric power at low voltage obtained by lowering the voltage supplied from the battery 21 may be supplied to the starter motor 15. As a result, the supply of an unnecessarily high voltage can be restrained. In addition, a fluctuation in supplied voltage due to a fluctuation in battery voltage can also be reduced.

As described above, according to this fourth embodiment, the inverter 22 is further provided to transform the voltage supplied from the battery 21. As a result, the supply of the unnecessarily high voltage can be restrained. In addition, a stable voltage can be supplied.

The present invention is not limited to each of the embodiments described above. It is apparent that the present invention encompasses all the possible combinations of the embodiments described above. For example, Step S10 of the first embodiment illustrated in FIG. 2, Step S210 of the second embodiment illustrated in FIG. 4, the starter motor rotation start condition in Step S310 of the third embodiment illustrated in FIG. 6, Step S30 of the first embodiment illustrated in FIG. 2, Step S30A of the second embodiment illustrated in FIG. 4, and the pinion gear meshing condition in Step S30B of the third embodiment illustrated in FIG. 6 may be appropriately implemented in different combinations according to situations as long as the necessary timer and rotation speed detecting section are provided.

Moreover, though the starter control section 13 and the engine ECU 10 included in the engine starting device 18 are illustrated separately, the processing in the starter control section 13 may be performed in the engine ECU 10. Alternatively, a different dedicated ECU may be provided independently of the engine ECU 10.

What is claimed is:

1. An engine starting device for an idling-stop vehicle, for stopping an engine upon satisfaction of a predetermined idling-stop condition during idling of the vehicle, comprising:

a ring gear to be connected to a crank shaft of the engine;

a starter motor unit comprising a starter motor, a pinion gear for transmitting rotation of the starter motor, and a pinion gear connection means for causing the pinion gear to mesh with the ring gear; and a starter control section for controlling the starter motor unit, wherein the starter control section energizes the starter motor to cause the starter motor to rotate upon satisfaction of a predetermined starter motor rotation start condition prior to clearing of the idling-stop condition in response to a restart request after the satisfaction of the idling-stop condition, and causes the pinion gear to mesh with the ring gear to be connected thereto by the pinion gear connection means upon satisfaction of a predetermined pinion gear meshing condition.

2. The engine starting device for an idling-stop vehicle according to claim 1, further comprising a ring gear rotation detecting means for detecting a rotation speed of the ring gear, wherein the pinion gear meshing condition is that the rotation speed of the ring gear becomes less than a second predetermined value.

3. The engine starting device for an idling-stop vehicle according to claim 1, further comprising at least one of a timer for measuring an elapsed period of time after the satisfaction of the idling-stop condition and a ring gear rotation detecting means for detecting a rotation speed of the ring gear, wherein the pinion gear meshing condition is at least one of: elapse of a second predetermined period of time after the satisfaction of the idling-stop condition; and the rotation speed of the ring gear becoming less than a second predetermined value.

4. The engine starting device for an idling-stop vehicle according to claim 1, further comprising a ring gear rotation speed detecting means for detecting a rotation speed of the ring gear and a pinion gear rotation speed detecting means for detecting a rotation speed of the pinion gear, wherein the pinion gear meshing condition is that a difference between the rotation speed of the pinion gear, which is detected by the pinion gear rotation speed detecting means, and the rotation speed of the ring gear, which is detected by the ring gear rotation speed detecting means, becomes less than a third predetermined value.

5. The engine starting device for an idling-stop vehicle according to claim 1, wherein the starter control section stops energizing the starter motor upon the satisfaction of the pinion gear meshing condition.

6. The engine starting device for an idling-stop vehicle according to claim 1, further comprising a ring gear rotation speed detecting means for detecting a rotation speed of the ring gear, wherein the starter control section comprises a meshing inhibiting means for inhibiting the ring gear and the pinion gear from meshing with each other even when the pinion gear meshing condition is satisfied during a time period in which the engine is not completely stopped after the satisfaction of the idling-stop condition and the rotation speed of the ring gear, which is detected by the ring gear rotation speed detecting means, is equal to or less than a fourth predetermined value for judging a possibility of reverse rotation of the ring gear.

7. The engine starting device for an idling-stop vehicle according to claim 1, wherein the starter motor is connected to a battery through a transformer, and the starter control section controls the transformer to cause the starter motor to be energized with a voltage lower than a battery voltage.

8. The engine starting device for an idling-stop vehicle according to claim 1, wherein the starter motor rotation start condition is the same as the idling-stop condition.

9. The engine starting device for an idling-stop vehicle according to claim 8, further comprising a ring gear rotation detecting means for detecting a rotation speed of the ring gear, wherein the pinion gear meshing condition is that the rotation speed of the ring gear becomes less than a second predetermined value.

10. The engine starting device for an idling-stop vehicle according to claim 8, further comprising at least one of a timer for measuring an elapsed period of time after the satisfaction of the idling-stop condition and a ring gear rotation detecting means for detecting a rotation speed of the ring gear, wherein the pinion gear meshing condition is at least one of: elapse of a second predetermined period of time after the satisfaction of the idling-stop condition; and the rotation speed of the ring gear becoming less than a second predetermined value.

11. The engine starting device for an idling-stop vehicle according to claim 8, further comprising a ring gear rotation speed detecting means for detecting a rotation speed of the ring gear and a pinion gear rotation speed detecting means for detecting a rotation speed of the pinion gear, wherein the pinion gear meshing condition is that a difference between the rotation speed of the pinion gear, which is detected by the pinion gear rotation speed detecting means, and the rotation speed of the ring gear, which is detected by the ring gear rotation speed detecting means, becomes less than a third predetermined value.

12. The engine starting device for an idling-stop vehicle according to claim 1, further comprising a timer for measuring an elapsed period of time from the satisfaction of the idling-stop condition, wherein the starter motor rotation start condition is that a first predetermined period of time elapses after the satisfaction of the idling-stop condition.

13. The engine starting device for an idling-stop vehicle according to claim 12, further comprising a ring gear rotation detecting means for detecting a rotation speed of the ring gear, wherein the pinion gear meshing condition is that the rotation speed of the ring gear becomes less than a second predetermined value.

14. The engine starting device for an idling-stop vehicle according to claim 12, further comprising at least one of a timer for measuring an elapsed period of time after the satisfaction of the idling-stop condition and a ring gear rotation detecting means for detecting a rotation speed of the ring gear, wherein the pinion gear meshing condition is at least one of: elapse of a second predetermined period of time after the satisfaction of the idling-stop condition; and the rotation speed of the ring gear becoming less than a second predetermined value.

15. The engine starting device for an idling-stop vehicle according to claim 12, further comprising a ring gear rotation speed detecting means for detecting a rotation speed of the ring gear and a pinion gear rotation speed detecting means for detecting a rotation speed of the pinion gear, wherein the pinion gear meshing condition is that a difference between the rotation speed of the pinion gear, which is detected by the pinion gear rotation speed detecting means, and the rotation speed of the ring gear, which is detected by the ring gear rotation speed detecting means, becomes less than a third predetermined value.

16. The engine starting device for an idling-stop vehicle according to claim 1, further comprising a ring gear rotation detecting means for detecting a rotation speed of the ring gear, wherein the starter motor rotation start condition is that the rotation speed of the ring gear becomes equal to or less than a first predetermined value after the satisfaction of the idling-stop condition.

17. The engine starting device for an idling-stop vehicle according to claim 16, further comprising a ring gear rotation detecting means for detecting a rotation speed of the ring gear, wherein the pinion gear meshing condition is that the rotation speed of the ring gear becomes less than a second predetermined value.

18. The engine starting device for an idling-stop vehicle according to claim 16, further comprising at least one of a timer for measuring an elapsed period of time after the satisfaction of the idling-stop condition and a ring gear rotation detecting means for detecting a rotation speed of the ring gear, wherein the pinion gear meshing condition is at least one of: elapse of a second predetermined period of time after the satisfaction of the idling-stop condition; and the rotation speed of the ring gear becoming less than a second predetermined value.

19. The engine starting device for an idling-stop vehicle according to claim 16, further comprising a ring gear rotation speed detecting means for detecting a rotation speed of the ring gear and a pinion gear rotation speed detecting means for detecting a rotation speed of the pinion gear, wherein the pinion gear meshing condition is that a difference between the rotation speed of the pinion gear, which is detected by the pinion gear rotation speed detecting means, and the rotation speed of the ring gear, which is detected by the ring gear rotation speed detecting means, becomes less than a third predetermined value.

* * * * *